(12) United States Patent
Hecht (10) Patent No.: US 8,469,638 B2
(45) Date of Patent: Jun. 25, 2013

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 76 days.

(21) Appl. No.: 13/341,510

(22) Filed: Dec. 30, 2011

(65) Prior Publication Data

US 2012/0201616 A1  Aug. 9, 2012

(30) Foreign Application Priority Data

Feb. 8, 2011  (IL) .......................................... 211113

(51) Int. Cl.
*B23B 27/00*  (2006.01)
*B23B 27/04*  (2006.01)

(52) U.S. Cl.
USPC ............. 407/103; 407/102; 407/40; 407/47; 407/113

(58) Field of Classification Search
USPC ..................... 407/40, 47, 101, 102, 103, 113
See application file for complete search history.

(56) References Cited

U.S. PATENT DOCUMENTS

| | | | | |
|---|---|---|---|---|
| 1,146,546 A | * | 7/1915 | Amborn | 407/10 |
| 3,354,526 A | * | 11/1967 | Erkfritz | 407/40 |
| 5,112,163 A | | 5/1992 | Veilleux | |
| 6,146,060 A | * | 11/2000 | Rydberg et al. | 407/40 |
| 6,241,433 B1 | * | 6/2001 | Rydberg et al. | 408/233 |
| 6,880,437 B2 | * | 4/2005 | Sjoo et al. | 82/158 |
| 7,001,114 B2 | * | 2/2006 | Blucher et al. | 407/103 |
| 7,150,590 B2 | | 12/2006 | Schäfer et al. | |
| 7,240,593 B2 | * | 7/2007 | Little | 82/1.11 |
| 8,137,034 B2 | * | 3/2012 | Noureddine | 407/11 |

FOREIGN PATENT DOCUMENTS

| | | |
|---|---|---|
| DE | 34 48 086 | 12/1991 |
| DE | 34 48 086 C2 | 12/1991 |
| WO | WO 2004/002662 | 1/2004 |

OTHER PUBLICATIONS

International Search report dated Apr. 25, 2012 issued in PCT counterpart application (No. PCT/IL2012/000021).

* cited by examiner

*Primary Examiner* — Will Fridie, Jr.
(74) *Attorney, Agent, or Firm* — Womble Carlyle (57) ABSTRACT

A cutting insert for mounting on an insert holder of a cutting tool. The cutting insert has a rear surface with two protuberances. The insert holder has a base surface with two recesses. Three abutment regions are formed on the side surfaces of the two protuberances and the two recesses when the cutting insert is releasably retained in the insert holder with a retaining screw. Two further abutment regions are formed between the two holder recess lower surfaces and the two insert protuberance upper surfaces.

25 Claims, 4 Drawing Sheets

CUTTING TOOL AND CUTTING INSERT THEREFOR

FIELD OF THE INVENTION

The subject matter of the present application relates to internal grooving cutting tools of the type in which a cutting insert is retained in an insert holder by means of a retaining screw.

BACKGROUND OF THE INVENTION

Within the field of internal grooving and turning, coupling mechanisms are known where cutting inserts are detachably secured in an insert holder. In such cutting tools a cutting insert may abut the insert holder at several abutment regions in order to secure the cutting insert to the insert holder. However, these abutment regions may limit the ability to reposition, and also the ability to place left and right handed inserts in the same insert holder, without any modifications to, or reconfiguration of, the insert holder.

German Patent DE3448086 discloses a cutting insert and an insert holder for internal grooving. The insert has three radially extending protrusions and the insert holder has three radially extending grooves. The insert and the holder are coupled together when the protrusions are placed in the grooves.

U.S. Pat. No. 7,001,114 discloses a cutting insert and an insert holder for internal grooving where the coupling includes two interacting surfaces disposed on the insert and the holder, respectively. The interacting surfaces are profiled to intermesh with one another to define an intermeshing region of the coupling.

U.S. Pat. No. 7,150,590 discloses a tool including a holder with a seat for receiving a cutting plate which has a coupling part. The coupling part has three radially directed ribs which couple with three matching radially directed grooves in the holder seat.

It is an object of the subject matter of the present application to provide an improved coupling mechanism providing a more secure mounting for the insert.

It is an object of the subject matter of the present application to provide an improved coupling mechanism having both resistive forces and clamping forces in the circumferential direction.

It is an object of the subject matter of the present application to provide an improved coupling mechanism where the cutting insert can be indexed by 180° and fitted in the insert holder.

It is an object of the subject matter of the present application to provide an improved coupling mechanism where the insert holder can accommodate a left or right handed cutting insert.

SUMMARY OF THE INVENTION

In accordance with the subject matter of the present application there is provided cutting insert, for internal grooving comprising:
a front surface;
a rear surface;
a peripheral surface extending between the front and rear surfaces;
a cutting portion;
a mounting portion comprising:
a lower rear surface; and
exactly two insert protuberances, a first insert protuberance and a second insert protuberance, protruding from the lower rear surface in a direction away from the front surface, each insert protuberance comprising:
two insert protuberance side surfaces extending in a direction away from the lower rear surface; and
an insert protuberance upper surface located between the two insert protuberance side surfaces and distal the lower rear surface; and
a through bore, passing through the front and rear surfaces; wherein
the two insert protuberance side surfaces on the first insert protuberance form first and second insert protuberance side surfaces that converge towards each other in a direction from the peripheral surface towards the through bore, and the first and second insert protuberance side surfaces form a protuberance wedge angle therebetween having a bisector;
the two insert protuberance side surfaces on the second insert protuberance form third and fourth insert protuberance side surfaces that converge towards each other in a direction from the peripheral surface towards the through bore;
in a rear view of the cutting insert a minimum first distance between an imaginary line laying on the first insert protuberance side surface and the fourth insert protuberance side surface is greater than a second distance between the second insert protuberance side surface and an imaginary line laying on the third insert protuberance side surface; and the angle between the third insert protuberance side surface and the bisector, is equal to half the protuberance wedge angle.

According to the subject matter of the present application, there is also provided a tool body comprising an insert holder, the insert holder comprising:
a base surface comprising:
an upper base surface;
exactly two holder recesses, a first holder recess and a second holder recess being recessed from the upper base surface, each holder recess comprising:
two holder recess side surfaces located extending in a direction away from the upper base surface; and
a holder recess lower surface located between the two holder recess side surfaces and distal the upper base surface;
a holder peripheral surface, oriented transversely to the base surface, forming a boundary of the base surface, and extending in a direction away from the base surface; and
a threaded bore in the base surface; wherein
the two holder recess side surfaces on the first holder recess form first and second holder recess side surfaces that converge towards each other in a direction from the holder peripheral surface towards the threaded bore, and the first and second holder recess side surfaces form a recess wedge angle therebetween having a bisector;
the two holder recess side surfaces on the second holder recess form the third and fourth holder recess side surfaces that converge towards each other in a direction from the holder peripheral surface towards the threaded bore, and the third and fourth holder recess side surfaces form a recess wedge angle therebetween having the bisector; and
in a front view of the insert holder a third distance between the first holder recess side surface and an imaginary line laying on the fourth holder recess side surface is equal to a fourth distance between an imaginary line laying on the second holder recess side surface and the third holder recess side surface.

According to the subject matter of the present application, there is also provided a cutting tool, having a longitudinal axis, comprising the cutting insert releasably retained by a retaining screw in a corresponding insert holder of the tool body; wherein the protuberance and recess wedge angles are both equal;

the second, third and fourth distances are all equal and less than the first distance;

the first and second insert protuberance side surfaces of the cutting insert abut the first and second holder recess side surfaces of the insert holder respectively;

the third holder recess side surface of the insert holder abuts the third insert protuberance side surface of the cutting insert;

the two holder recess lower surfaces of the insert holder abut the two insert protuberance upper surfaces of the cutting insert; and the fourth holder recess side surface of the insert holder faces and is distanced from the fourth insert protuberance side surface of the cutting insert.

According to the subject matter of the present application, there is also provided an internal grooving cutting insert comprising:

a front surface;

a rear surface;

a through bore, passing through the front and rear surfaces and having a bore axis;

a peripheral surface extending between the front and rear surfaces;

a cutting portion; and a mounting portion comprising:

a lower rear surface;

a first insert protuberance protruding from the lower rear surface in a direction away from the front surface, the first insert protuberance comprising first and second insert protuberance side surfaces that converge towards each other and form a protuberance wedge angle therebetween having a bisector; and a second insert protuberance protruding from the lower rear surface in a direction away from the front surface, the second insert protuberance comprising third and fourth insert protuberance side surfaces that converge towards each other; wherein in a rear view of the cutting insert a first arc of an imaginary circle centered at a center point on the bisector, extending between circumferentially opposing first and third insert protuberance side surfaces has a length which is shorter than that of a second arc of the imaginary circle, extending between circumferentially opposing second and fourth insert protuberance side surfaces.

According to the subject matter of the present application, there is also provided a cutting tool comprising:

a tool body; and a cutting insert releasably retained by a retaining screw to the insert holder wherein, during grooving operations, cutting forces having a force circumferential direction about the through bore are applied on the cutting insert.

BRIEF DESCRIPTION OF THE FIGURES

For a better understanding of the subject matter of the present application and to show how the same may be carried out in practice, reference will now be made to the accompanying drawings, in which.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in order to provide a thorough understanding of the subject matter of the present application. However, it will also be apparent to one skilled in the art that the subject matter of the present application may be practiced without the specific details presented herein. Furthermore, well-known features may be omitted or simplified in order not to obscure the subject matter of the present application.

Figure 1:
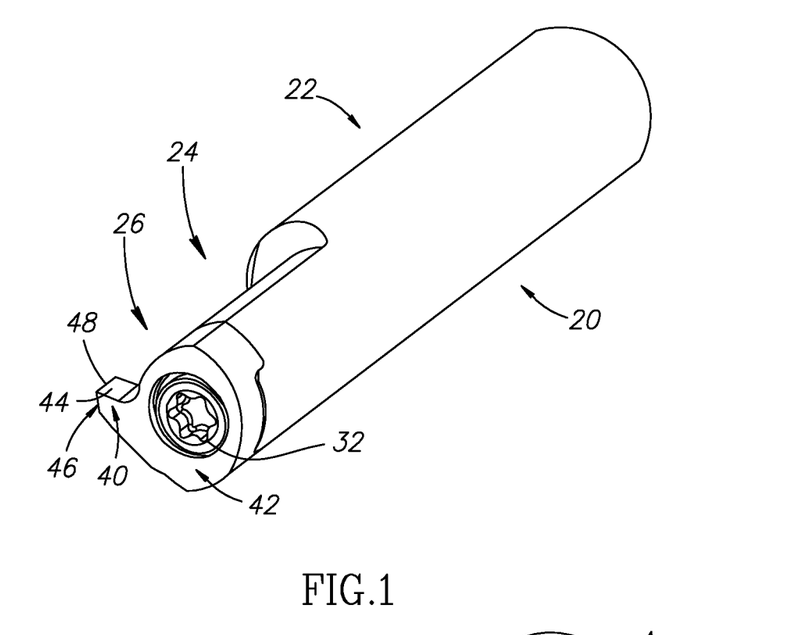
FIG. 1 is a perspective view of a cutting tool in accordance with some embodiments of the subject matter of the present application.
Figure 2:
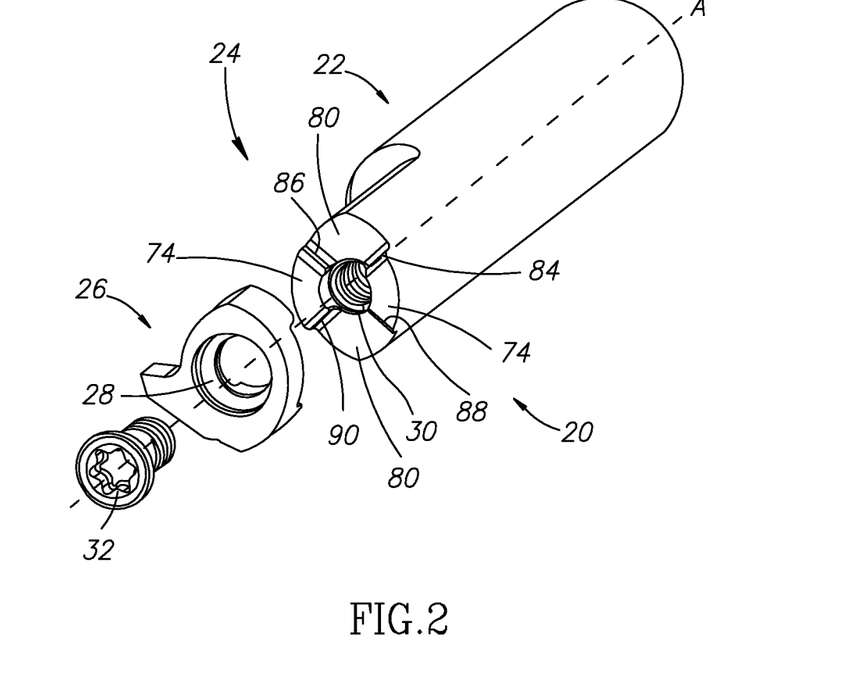
FIG. 2 is an exploded perspective view of the cutting tool shown in FIG. 1.

Attention is first drawn to FIGS. 1 and 2, showing a cutting tool 20 in accordance with embodiments of the subject matter of the present application. The cutting tool 20 includes a tool body 22 having an insert holder 24 with a cutting insert 26 removably retained in the insert holder 24. The cutting tool 20 has a longitudinal axis A defining a forward to rearward direction, with the cutting insert 26 and insert holder 24 located at the forward end of the cutting tool 20. The cutting insert 26 has a through bore 28 having a bore axis D. The insert holder 24 has a threaded bore 30. The cutting insert 26 is secured to the insert holder 24 by means of a retaining screw 32 passing through the through bore 28 and threadingly received in the threaded bore 30. The tool body 22 can be manufactured from a first material and the cutting insert 26 from a second harder material. For example, the tool body 22 might be made of steel and the cutting insert 26 can be made of cemented carbide.

Figure 3:
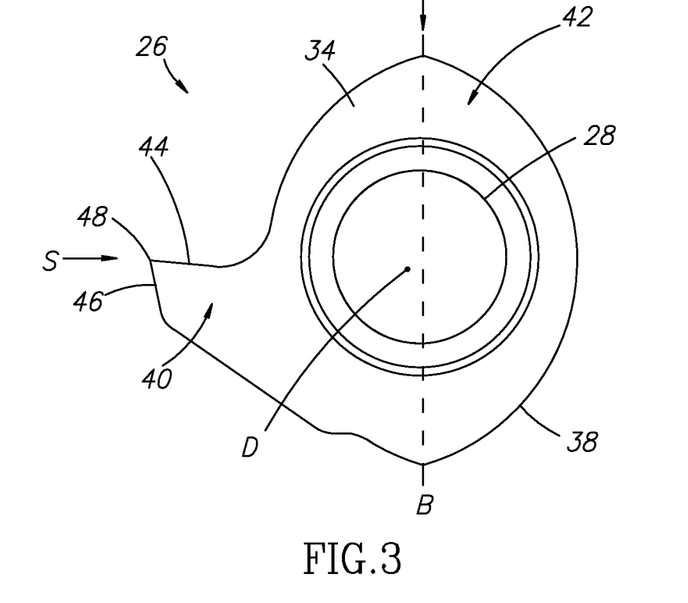
FIG. 3 is a front view of a cutting insert in accordance with some embodiments of the subject matter of the present application.
Figure 4:
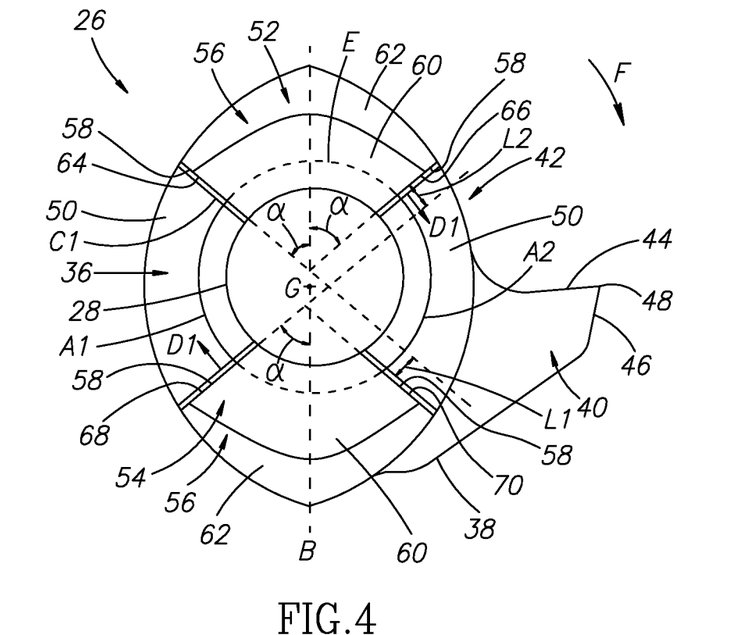
FIG. 4 is a rear view of the cutting insert shown in FIG. 3.

Referring to FIGS. 3 and 4, the cutting insert 26 has a front surface 34, a rear surface 36 and a peripheral surface 38 extending therebetween. The cutting insert 26 has unitary integral one-piece construction with a cutting portion 40 extending from a mounting portion 42.

In accordance with some embodiments of the subject matter of the present application, the peripheral surface 38 of the cutting portion 40 can include a rake surface 44, a relief surface 46 and a cutting edge 48, which can be formed where the rake surface 44 and the relief surface 46 merge. The rake surface 44 and the fourth insert protuberance side surface 70 may face in the same general circumferential direction about the through bore 28. In accordance with some embodiments of the subject matter of the present application, the cutting edge 48 can extend fully across the peripheral surface 38 between the front and rear surfaces 34, 36 of the cutting insert 26. The cutting edge 48 can be generally parallel to the bore axis D of the through bore 28. The rake surface 44 can be generally radially aligned with the bore axis D.

The mounting portion 42 includes a lower rear surface 50 and two insert protuberances, a first insert protuberance 52 and a second insert protuberance 54. Each insert protuberance 52, 54 protrudes from the lower rear surface 50 and includes an insert protuberance upper surface 56 and two insert protuberance side surfaces 58 located between the lower rear surface 50 and the insert protuberance upper surfaces 56.

In accordance with some embodiments of the subject matter of the present application, the lower rear surface 50 can be flat. The insert protuberance upper surfaces 56 can be divided into inner and outer portions 60, 62, where the inner portion 60 is adjacent the through bore 28 and the outer portion 62 is adjacent the peripheral surface 38. The outer portions 62 can be flat and coplanar and can be distanced further from the lower rear surface 50 than the inner portions 60.

Referring to FIG. 4, the two insert protuberance side surfaces 58 on the first insert protuberance 52 form first and second insert protuberance side surfaces 64, 66 and the two insert protuberance side surfaces 58 on the second insert protuberance 54 form third and fourth insert protuberance side surfaces 68, 70. In accordance with some embodiments of the subject matter of the present application, the first, second and third insert protuberance side surfaces 64, 66, 68 can be oriented substantially perpendicular to the lower rear surface 50 and are used to form abutment regions with the insert holder 24 in order to securely fasten the cutting insert 26 to the insert holder 24.

The first and second insert protuberance side surfaces 64, 66 converge towards each other in a direction away from the peripheral surface 38 towards the through bore 28 and form a protuberance wedge angle $2\alpha$, having a bisector B. As seen in FIG. 3, the bore axis D is offset from the bisector B. The third and fourth insert protuberance side surfaces 68, 70 converge towards each other in a direction away from the peripheral surface 38 towards the through bore 28. The angle between the third insert protuberance side surface 68 and the bisector B is equal to half the protuberance wedge angle $2\alpha$. In accordance with some embodiments of the subject matter of the present application, the protuberance wedge angle $2\alpha$ can be greater than 40°.

As shown in a rear view of the cutting insert 26 (FIG. 4), a minimum first distance L1 between an imaginary line extending through the first insert protuberance side surface 64 and the fourth insert protuberance side surface 70 is greater than a second distance L2 between the second insert protuberance side surface 66 and an imaginary line extending through the third insert protuberance side surface 68.

In accordance with some embodiments of the subject matter of the present application, the portion of the peripheral surface 38 that is located on the side of the bisector B furthest from the cutting portion 40 can be semi-oval-shaped. The first and third insert protuberance side surfaces 64, 68 can be situated at a greater distance from the cutting portion 40 than the center of through bore 28 and the second insert protuberance side surface 66 can be situated closer to the cutting portion 40 than the center of the through bore 28.

In accordance with some embodiments of the subject matter of the present application, the first and second insert protuberance side surfaces 64, 66 converge towards each other in a direction from the peripheral surface 38 to a first location in the through bore 28 that is offset from the through bore axis D. Similarly, the third and fourth insert protuberance side surfaces 68, 70 converge towards each other in a direction from the peripheral surface 38 to a second location in the through bore 28 that is offset from the through bore axis D. In a rear view of the cutting insert 26 a first arc A1 of an imaginary circle E centered at a center point G on the bisector B and extending between circumferentially opposing first and third insert protuberance side surfaces 64, 68 has a length which is shorter than that of a second arc A2 of the imaginary circle E extending between circumferentially opposing second and fourth insert protuberance side surfaces 66, 70. The center point G can be located at any point on the bisector B contained within the through bore 28.

Figure 5:
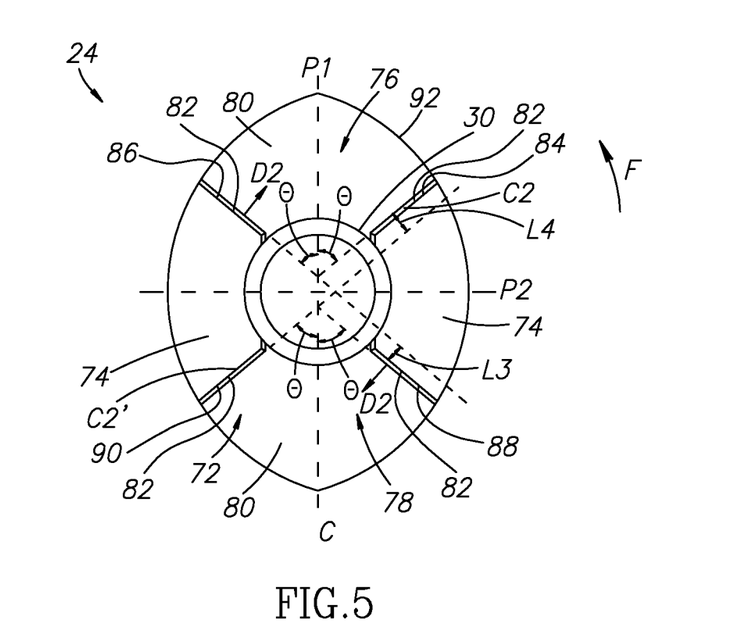
FIG. 5 is a front view of an insert holder in accordance with some embodiments of the subject matter of the present application.
Figure 6:
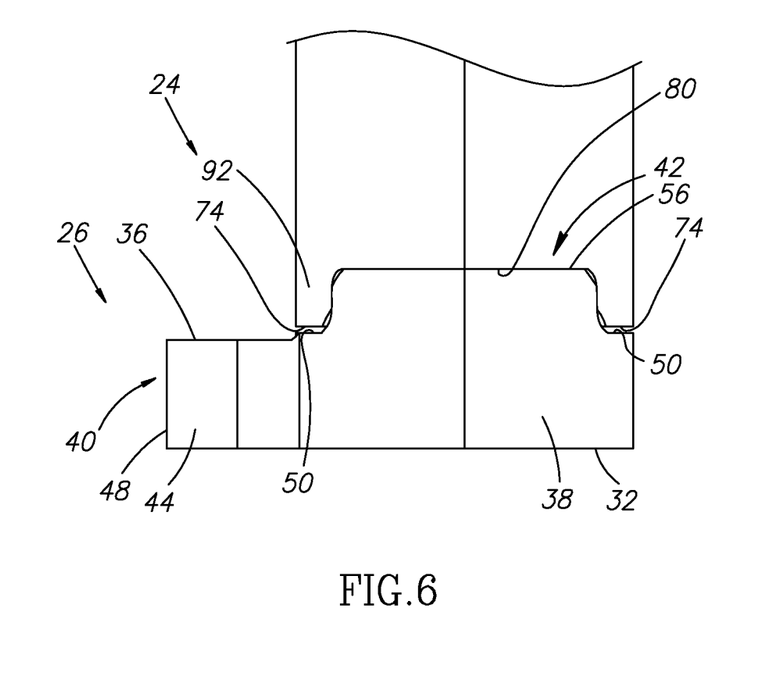
FIG. 6 is a top view of a cutting insert retained in an insert holder, in accordance with some embodiments of the subject matter of the present application, looking in the direction of line T as shown FIG. 3.
Figure 7:
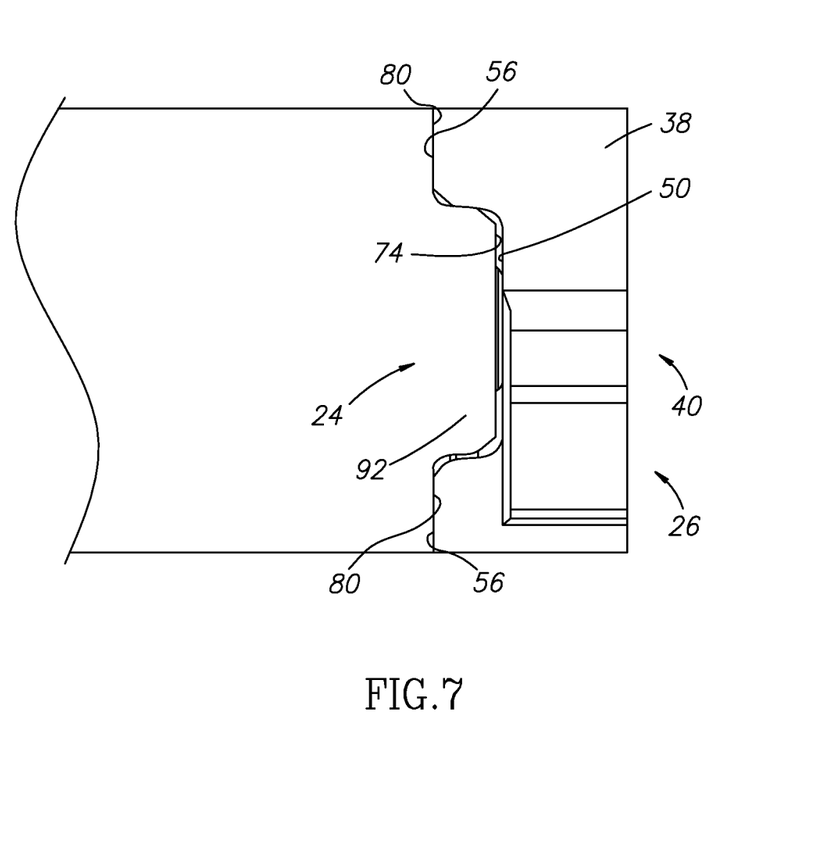
FIG. 7 is a side view of the cutting insert and the insert holder shown in FIG. 6 looking in the direction of line S as shown FIG. 3.

Attention is now drawn to FIG. 5, showing the insert holder 24. The insert holder 24 includes a base surface 72 having an upper base surface 74 and two holder recesses, a first holder recess 76 and a second holder recess 78. Each holder recess 76, 78 is receded from the upper base surface 74 and includes a holder recess lower surface 80 and two holder recess side surfaces 82. The two holder recess side surfaces 82 are located between the upper base surface 74 and the holder recess lower surface 80. The upper base surface 74 can be substantially flat. The two holder recess lower surfaces 80 can be flat and coplanar.

The two holder recess side surfaces 82 of the first holder recess 76 form first and second holder recess side surfaces 84, 86 and the two holder recess side surfaces 82 on the second holder recess 78 form the third and fourth holder recess side surfaces 88, 90. In accordance with some embodiments of the subject matter of the present application, the first, second and third holder recess side surfaces 84, 86, 88 can be oriented substantially perpendicular to the upper base surface 74 and are used to form abutment regions with the cutting insert 26 in order to securely fasten the cutting insert 26 to the insert holder 24.

The first and second holder recess side surfaces 84, 86 converge towards each other in a direction away from the holder peripheral surface 92 towards the threaded bore 30 and form a recess wedge angle $2\theta$ having a bisector C. The third and fourth holder recess side surfaces 88, 90 converge towards each other in a direction away from the holder peripheral surface 92 towards the threaded bore 30 and form a recess wedge angle $2\theta$ having the bisector C. In accordance with some embodiments of the subject matter of the present application, the recess wedge angle $2\theta$ can be greater than 40°.

In a front view of the insert holder 24 (see FIG. 5) a third distance L3 between the first holder recess side surface 84 and an imaginary line extending through the fourth holder recess side surface 90 is equal to a fourth distance L4 between an imaginary line extending through the second holder recess side surface 86 and the third holder recess side surface 88.

In accordance with some embodiments of the subject matter of the present application, the insert holder 24 can be mirror symmetrical with respect to a first plane of symmetry P1 containing the bisector C. The insert holder 24 can be mirror symmetrical with respect to a second plane of symmetry P2 perpendicular to the first plane P1. The insert holder 24 can be oval-shaped.

The seating and support of the cutting insert 26 in the insert holder 24 will be described with reference to FIGS. 1, 2, 4, 5 and 6. In accordance with the subject matter of an embodiment of the present application, in order to ensure correct coupling of the cutting insert 26 and the insert holder 24, the protuberance and recess wedge angles $2\alpha$, $2\theta$ are equal, the first distance L1 is greater than the second, third and fourth distances L2, L3 and L4, respectively, and the second, third and fourth distances L2, L3 and L4 are all equal. When the cutting insert 26 is located in the insert holder 24, the two insert protuberances 52, 54 of the cutting insert 26 are located in the two holder recesses 76, 78 of the insert holder 24. There are five abutment regions at which the cutting insert 26 and the insert holder 24 engage each other. First and second abutments region are formed between the two holder recess lower surfaces 80 of the insert holder 24 and the two insert protuberance upper surfaces 56 of the cutting insert 26. In accordance with some embodiments of the subject matter of the present application, when the insert protuberance upper surfaces 56 include an inner and outer portion 60, 62 then the first and second abutments regions are formed between the two holder recess lower surfaces 80 of the insert holder 24 and the two outer portions 62 of the insert protuberance upper surfaces 56. Having these abutment regions located as far away as possible from each other improves stability of the cutting insert 26. Third and fourth abutment regions are formed between the first and second insert protuberance side surfaces 64, 66 of the cutting insert 26 and the first and second holder recess side surfaces 84, 86 of the insert holder 24. A fifth abutment region is formed between the third holder recess side surface 88 of the insert holder 24 and the third insert protuberance side surface 68 of the cutting insert 26. It is important to note there is a space between the upper base surface 74 of the insert holder 24 and the lower rear surface 50 of the cutting insert 26.

The third, fourth and fifth abutment regions are generated by designing the through bore 28 to be suitably eccentric in relation to the threaded bore 30. Due to the eccentricity, when the retaining screw 32 is tightened, a biasing force is applied to the cutting insert 26 forcing the cutting insert 26 against the insert holder 24 at the third, fourth and fifth abutment regions. The same biasing force causes the fourth insert protuberance side surface 70 to be moved away from the fourth holder recess side surface 90 so that they are distanced apart, i.e., there is a gap between the two aforementioned surfaces and they do not abut each other.

During grooving operations, when cutting forces act on the cutting insert 26, the third, fourth and fifth abutment regions remain in contact, and the fourth insert protuberance side surface 70 and the fourth holder recess side surface 90 remain distanced apart. The fourth and fifth abutment regions provide primarily tangential support for the cutting insert 26 against cutting forces acting on the cutting insert 26 and the third abutment region is maintained by the eccentricity of the retaining screw 32 and ensures that the cutting insert 26 is well constrained in the insert holder 24. Furthermore, the first and second abutment regions provide axial support for the cutting insert 26 against cutting forces acting on the cutting insert 26 during an internal grooving operation.

Also during grooving operations the cutting tool 20 remains stationary and a work piece is rotated such that a cutting force, with a force circumferential direction F about the through bore 28, is applied on the cutting insert 26. The holder's second and third holder recess side surfaces 86, 88, which face against the force circumferential direction F, serve as resistive surfaces and provide resistive forces in the force circumferential direction indicated by D2. The first holder recess side surface 84, which faces the force circumferential direction F, serves as a clamping surface C2, while the fourth holder recess side surface 90 which also faces the force circumferential direction F remains unabutted. However, upon rotating the cutting insert 26 by 180°, the fourth hold recess side surface 90 serves as a clamping surface C2' while the first holder recess side surface 84 remains unabutted.

Also during grooving operations the cutting insert's second and third insert protuberance side surfaces 66, 68 which face the force circumferential direction F and are forced in the force circumferential direction indicated by D1. The first insert protuberance side surface 64, which faces against the force circumferential direction F, serves as a clamping surface C1, while the fourth insert protuberance side surface 70, which also faces against the force circumferential direction F, remains unabutted. Even upon rotating the cutting insert 26 by 180°, first insert protuberance side surface 64 still serves as a clamping surface C1 and the fourth insert protuberance side surface 70 still remains unabutted.

It should be noted that one feature of the subject matter of the present application is the ability to fit a left or right handed cutting insert in the same insert holder 24 with no need to change or reposition the aforementioned insert holder 24. Similarly the cutting insert 26 can be indexed by 180°, again with no need to change or reposition the aforementioned insert holder 24.

Another feature is having an oval-shaped cutting insert 26, which enables the size of the mounting portion 42 that can be positioned into a tube, for example, for internal grooving, to be maximized, thus allowing for a larger retaining screw 32 to be deployed, which provides a stronger coupling.

Although the subject matter of the present application has been described to a certain degree of particularity, it should be understood that various alterations and modifications could be made without departing from the spirit or scope of the invention as hereinafter claimed.

The invention claimed is:

1. A cutting insert (26), for internal grooving comprising:
   a front surface (34);
   a rear surface (36);
   a peripheral surface (38) extending between the front and rear surfaces (34, 36);
   a cutting portion (40);
   a mounting portion (42) comprising:
      a lower rear surface (50); and
      exactly two insert protuberances, a first insert protuberance (52) and a second insert protuberance (54), protruding from the lower rear surface (50) in a direction away from the front surface (34), each insert protuberance (52, 54) comprising:
         two insert protuberance side surfaces (58) extending in a direction away from the lower rear surface (50); and
         an insert protuberance upper surface (56) located between the two insert protuberance side surfaces (58) and distal the lower rear surface (50); and
   a through bore (28), passing through the front and rear surfaces (34, 36); wherein the two insert protuberance side surfaces (58) on the first insert protuberance (52) form first and second insert protuberance side surfaces (64, 66) that converge towards each other in a direction from the peripheral surface (38) towards the through bore (28), and the first and second insert protuberance side surfaces (64, 66) form a protuberance wedge angle ($2\alpha$) therebetween having a bisector (B);
   the two insert protuberance side surfaces (58) on the second insert protuberance (54) form third and fourth insert protuberance side surfaces (68, 70) that converge towards each other in a direction from the peripheral surface (38) towards the through bore (28);
   in a rear view of the cutting insert (26) a minimum first distance (L1) between an imaginary line laying on the first insert protuberance side surface (64) and the fourth insert protuberance side surface (70) is greater than a second distance (L2) between the second insert protuberance side surface (66) and an imaginary line laying on the third insert protuberance side surface (68); and the angle between the third insert protuberance side surface (68) and the bisector (B) is equal to half the protuberance wedge angle (2α).

2. The cutting insert (26) according to claim 1 wherein the first, second and third insert protuberance side surfaces (64, 66, 68) are oriented substantially perpendicular to the lower rear surface (50).

3. The cutting insert (26) according to claim 1 wherein the protuberance wedge angle (2α) is greater than 40°.

4. The cutting insert (26) according to claim 1 wherein the lower rear surface (50) is substantially flat.

5. The cutting insert (26) according to claim 1 wherein the two insert protuberance upper surfaces (56) further comprise inner and outer portions (60, 62); wherein
at least the outer portions (62) are flat and coplanar;
the outer portions (62) are adjacent the peripheral surface (38); and
the outer portions (62) are further from the lower rear surface (50) than the inner portions (60).

6. The cutting insert (26) according to claim 1 wherein, in a front view, the portion of the peripheral surface (38) that is located on the side of the bisector (B) furthest from the cutting portion (40) is semi-oval-shaped.

7. The cutting insert (26) according to claim 1; wherein
the first and third insert protuberance side surfaces (64, 68) are situated at a greater distance from the cutting portion (40) than the center of through bore (28); and
the second insert protuberance side surface (66) is situated closer to the cutting portion (40) than the center of the through bore (28).

8. The cutting insert (26) in accordance with claim 1, wherein the peripheral surface (38) of the cutting portion (40) includes a rake surface (44) and a relief surface (46) which merge at a cutting edge (48) wherein the rake surface (44) and the fourth insert protuberance side surface (70) face in the same general circumferential direction about the through bore (28).

9. The cutting insert (26) according to claim 8, wherein the cutting edge (48) extends between the front and rear surfaces (34, 36) of the cutting insert (26).

10. A tool body (22) comprising an insert holder (24), the insert holder (24) comprising:
a base surface (72) comprising:
an upper base surface (74);
exactly two holder recesses, a first holder recess (76) and a second holder recess (78) being recessed from the upper base surface (74), each holder recess (76, 78) comprising:
two holder recess side surfaces (82) located extending in a direction away from the upper base surface (74); and
a holder recess lower surface (80) located between the two holder recess side surfaces (82) and distal the upper base surface (74);
a holder peripheral surface (92), oriented transversely to the base surface (72), forming a boundary of the base surface (72), and extending in a direction away from the base surface (72); and
a threaded bore (30) in the base surface (72); wherein
the two holder recess side surfaces (82) on the first holder recess (76) form first and second holder recess side surfaces (84, 86) that converge towards each other in a direction from the holder peripheral surface (92) towards the threaded bore (30), and the first and second holder recess side surfaces (84, 86) form a recess wedge angle (2θ) therebetween having a bisector (C);

the two holder recess side surfaces (82) on the second holder recess (78) form the third and fourth holder recess side surfaces (88, 90) that converge towards each other in a direction from the holder peripheral surface (92) towards the threaded bore (30), and the third and fourth holder recess side surfaces (88, 90) form a recess wedge angle (20) therebetween having the bisector (C); and
in a front view of the insert holder (24) a third distance (L3) between the first holder recess side surface (84) and an imaginary line laying on the fourth holder recess side surface (90) is equal to a fourth distance (L4) between an imaginary line laying on the second holder recess side surface (86) and the third holder recess side surface (88).

11. The tool body (22) according to claim 10 wherein the first, second and third holder recess side surfaces (84, 86, 88) are oriented substantially perpendicular to the upper base surface (74).

12. The tool body (22) according to claim 10 wherein the recess wedge angle (2θ) is greater than 40°.

13. The tool body (22) according to claim 10 wherein the upper base surface (74) is substantially flat.

14. The tool body (22) according to claim 10 wherein the two holder recess lower surfaces (80) are flat and coplanar.

15. The tool body (22) according to claim 10 wherein, in a front view, the insert holder (24) is mirror symmetrical with respect to a first plane of symmetry (P1) containing the bisector (C).

16. The tool body (22) according to claim 10 wherein, in a front view, the insert holder (24) is mirror symmetrical with respect to a second plane of symmetry (P2) perpendicular to the first plane (P1).

17. The tool body (22) according to claim 10 wherein, in a front view, the insert holder (24) is oval-shaped.

18. A cutting tool (20), having a longitudinal axis (A), comprising the cutting insert (26) according to claim 1 releasably retained by a retaining screw (32) in a corresponding insert holder (24) of the tool body (22) according to claim 10; wherein
the protuberance and recess wedge angles (2α, 2θ) are both equal;
the second, third and fourth distances (L2, L3, L4) are all equal and less than the first distance (L1);
the first and second insert protuberance side surfaces (64, 66) of the cutting insert (26) abut the first and second holder recess side surfaces (84, 86) of the insert holder (24) respectively;
the third holder recess side surface (88) of the insert holder (24) abuts the third insert protuberance side surface (68) of the cutting insert (26);
the two holder recess lower surfaces (80) of the insert holder (24) abut the two insert protuberance upper surfaces (56) of the cutting insert (26); and
the fourth holder recess side surface (90) of the insert holder (24) faces and is distanced from the fourth insert protuberance side surface (70) of the cutting insert (26).

19. An internal grooving cutting insert (26) comprising:
a front surface (34);
a rear surface (36);
a through bore (28), passing through the front and rear surfaces (34, 36) and having a bore axis (D);
a peripheral surface (38) extending between the front and rear surfaces (34, 36);
a cutting portion (40); and
a mounting portion (42) comprising:
a lower rear surface (50);
a first insert protuberance (52) protruding from the lower rear surface (50) in a direction away from the front surface (34), the first insert protuberance comprising first and second insert protuberance side surfaces (64, 66) that converge towards each other and form a protuberance wedge angle (2α) therebetween having a bisector (B); and a second insert protuberance (54) protruding from the lower rear surface (50) in a direction away from the front surface (34), the second insert protuberance comprising third and fourth insert protuberance side surfaces (68, 70) that converge towards each other; wherein in a rear view of the cutting insert (26) a first arc (A1) of an imaginary circle (E) centered at a center point (G) on the bisector (B), extending between circumferentially opposing first and third insert protuberance side surfaces (64, 68) has a length which is shorter than that of a second arc (A2) of the imaginary circle (E), extending between circumferentially opposing second and fourth insert protuberance side surfaces (66, 70).

20. The cutting insert (26) according to claim 19, wherein:
the first and second insert protuberance side surfaces (64, 66) converge towards each other in a direction from the peripheral surface (38) to a first location in the through bore (28) that is offset from the bore axis (D); and
the third and fourth insert protuberance side surfaces (68, 70) converge towards each other in a direction from the peripheral surface (38) to a second location in the through bore (28) that is offset from the bore axis (D).

21. The cutting insert (26) according to claim 20, wherein:
in a rear view of the cutting insert (26) a first distance (L1) between an imaginary line laying on the first insert protuberance side surface (64) and the fourth insert protuberance side surface (70) is greater than a second distance (L2) between the second insert protuberance side surface (66) and an imaginary line laying on the third insert protuberance side surface (68).

22. The cutting insert (26) according to claim 19, wherein:
in a rear view of the cutting insert (26) a first distance (L1) between an imaginary line laying on the first insert protuberance side surface (64) and the fourth insert protuberance side surface (70) is greater than a second distance (L2) between the second insert protuberance side surface (66) and an imaginary line laying on the third insert protuberance side surface (68).

23. The cutting insert (26) according to claim 22, wherein:
the angle between the third insert protuberance side surface (68) and the bisector (B) is equal to half the protuberance wedge angle (2α).

24. A cutting tool (20) comprising:
a tool body (22) in accordance with claim 10; and
a cutting insert (26) in accordance with claim 19 releasably retained by a retaining screw (32) to the insert holder (24) wherein, during grooving operations, cutting forces having a force circumferential direction (F) about the through bore (28) are applied on the cutting insert (26).

25. The cutting tool (20) according to claim 24, wherein:
the second and third holder recess side surfaces (86, 88) face against the force circumferential direction (F) and serve as resistive surfaces which provide resistive forces against corresponding second and third insert protuberance side surfaces (66, 68) which face the force circumferential direction (F);
the first holder recess side surface (84) faces the force circumferential direction (F) and serves as a clamping surface (C2) that is clamped against a corresponding insert first insert protuberance side surface (64) which serves as a clamping service (C1) and which faces against the force circumferential direction (F); and
the fourth holder recess side surface (90) faces the force circumferential direction (F) and serves as neither a resistive surface nor a clamping surface.

* * * * *